G. T. WHITE.
WATER STRAINER FOR PUMPS AND THE LIKE.
APPLICATION FILED JAN. 3, 1918.

1,274,121.

Patented July 30, 1918.
2 SHEETS—SHEET 1.

Witness

G. T. White
Inventor by
Attorneys

UNITED STATES PATENT OFFICE.

GEORGE T. WHITE, OF PORTSMOUTH, OHIO, ASSIGNOR OF ONE-HALF TO JOHN N. ELLISON, OF PORTSMOUTH, OHIO.

WATER-STRAINER FOR PUMPS AND THE LIKE.

1,274,121.

Specification of Letters Patent.

Patented July 30, 1918.

Application filed January 3, 1918. Serial No. 210,195.

*To all whom it may concern:*

Be it known that I, GEORGE T. WHITE, a citizen of the United States, residing at Portsmouth, in the county of Scioto and State of Ohio, have invented a new and useful Water-Strainer for Pumps and the like, of which the following is a specification.

This invention relates to strainers for use at the inlet ends of the feed pipes of pumps, the present improvements being particularly designed for use where water is withdrawn from streams and other places where it is necessary to separate leaves, twigs and other trash from the water to prevent choking of the pump.

One of the objects of the invention is to provide a screen having a novel form of hood so arranged as to prevent the trash from coming against and clogging the screen but which will insure at all times a free flow of water through the screen and to the pump connected thereto.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—

Figure 1:
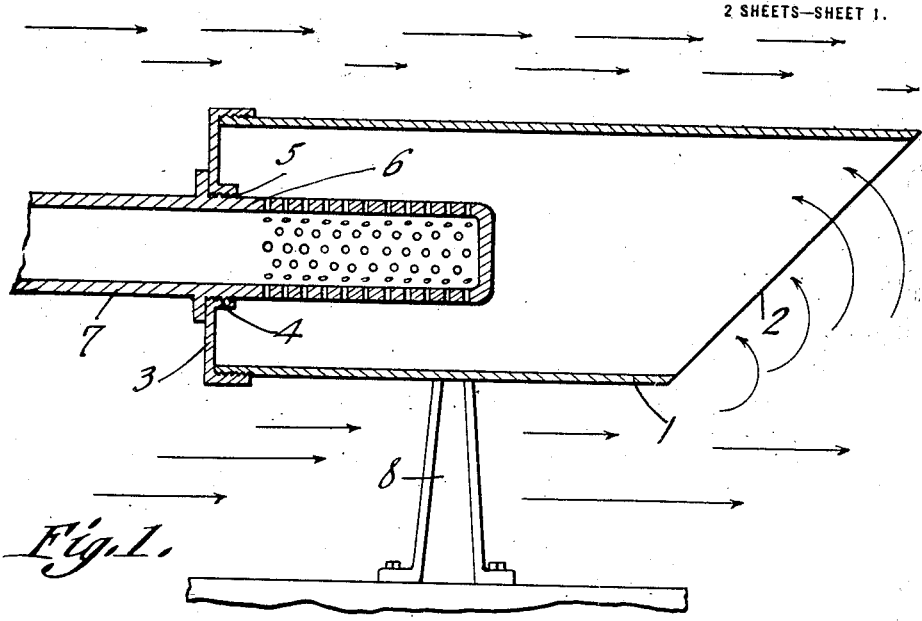
Figure 1 is a vertical longitudinal section through a screen having the present improvement combined therewith.

Referring to the figures by characters of reference 1 designates a cylindrical hood one end of which is open and undercut as indicated at 2 while the other end is provided with a cap 3 having a central opening 4. Engaging the threaded wall of the opening 4 is the threaded portion 5 of a strainer 6 which projects into the hood 1 and is of the usual or any preferred construction. This strainer may be formed at one end of a base 7 adapted to supply water to a pump, not shown.

The hood 1 may be mounted on suitable supports 8 which can be anchored in any desired manner within a body of water.

In using the device the hood 1 is placed in a body of water so that its open end 2 will be downstream. Thus during the sucking action of the pump connected to the strainer 6, water will be drawn into the hood upwardly through the undercut open end 2 thereof and any trash, such as leaves, twigs or the like floating upon the surface of the water will flow past the open end of the hood and will not move with the counterflow back into the hood and toward the strainer. Consequently the strainer will be kept clear at all times and the flow of water thereto will never be obstructed.

Figure 2:
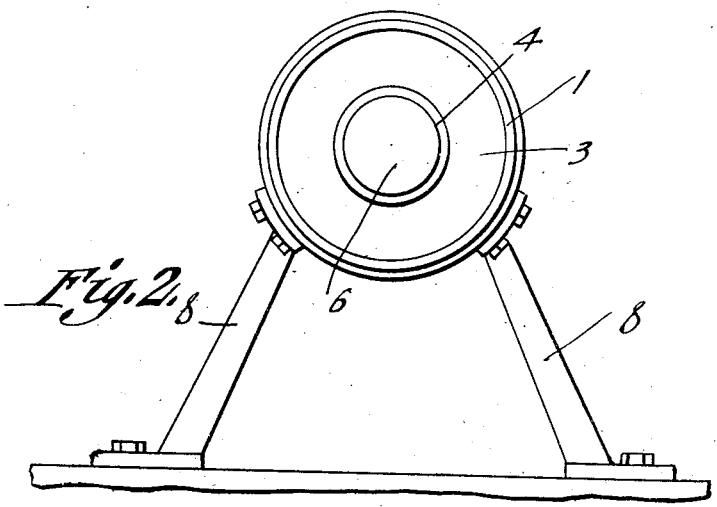
Fig. 2 is an end elevation showing the open end of the hood in which the screen is located.
Figure 3:
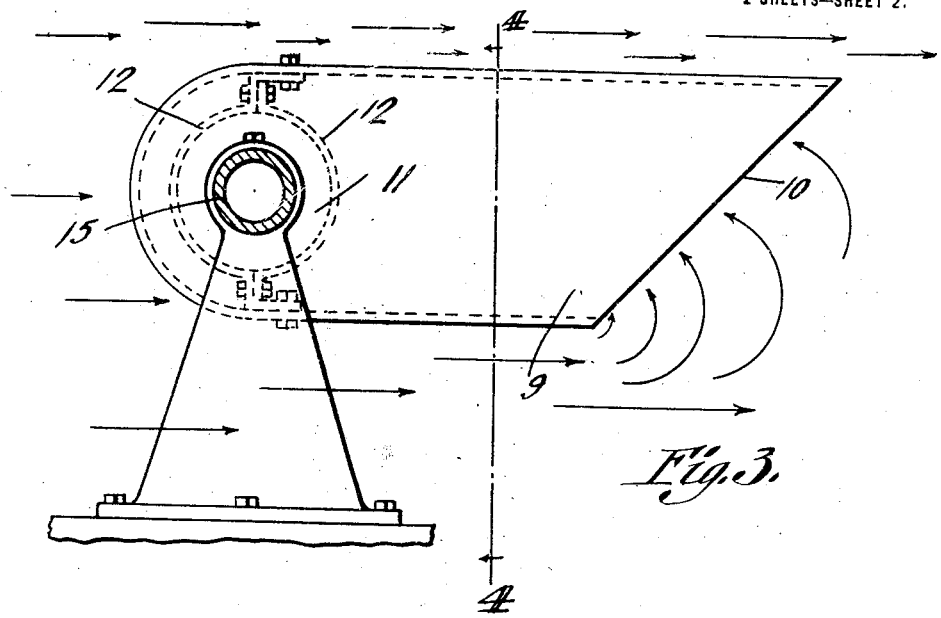
Fig. 3 is side elevation of a modified form of the invention.
Figure 4:
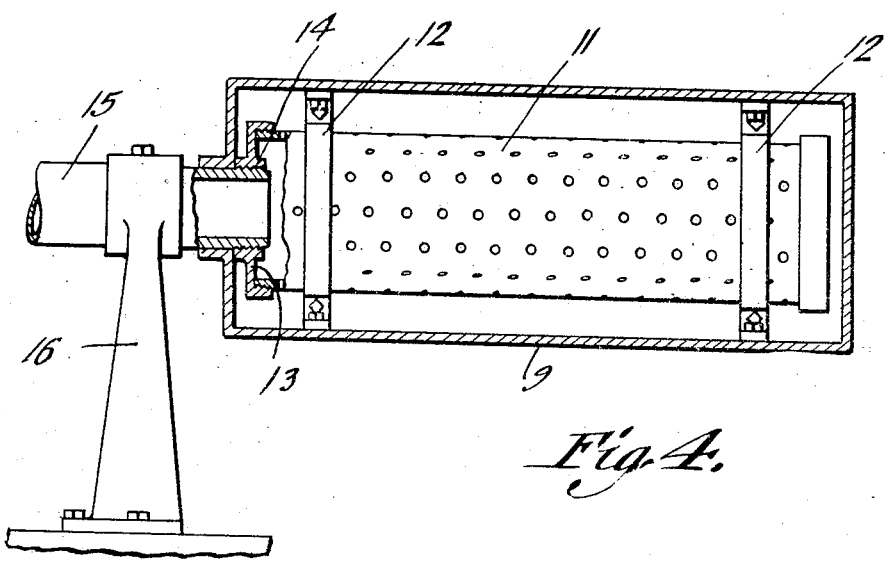
Fig. 4 is a section on the line 4—4 of Fig. 3.

Instead of utilizing a cylindrical hood as shown in Figs. 1 and 2, a box-like hood 9 may be used as shown in Figs. 3 and 4. This hood has its forward end undercut as at 10 while its rear end is preferably rounded so as to be concentric with the strainer 11 which is arranged transversely within the hood. This strainer may be supported in any suitable manner, as by means of split rings 12 secured in the hood and extending around the end portions of the strainer. The strainer is spaced from the hood and one end may be closed by a cap 13 having a central opening 14. An outflow pipe 15 extending to the pump, not shown, may be extended through one side of the hood 9 and engage the wall of the opening 14. This pipe is adapted to be mounted in a suitable support 16.

A device such as herein described not only prevents trash from clogging the strainer but also prevents sand from entering the pump and injuring the parts thereof.

What is claimed is:—

1. The combination with a strainer, of a hood housing the strainer and adapted to be submerged, said hood having an undercut open end adapted to be placed downstream within a current.

2. The combination with a strainer, adapted to be connected to end of the feed pipe of a pump or the like, of a hood housing the strainer and having an undercut inlet end adapted to be placed downstream within a moving body of water, said strainer being located in the opposite end portion of the hood.

In testimony that I claim the foregoing as my own I have hereto affixed my signature in the presence of two witnesses.

GEORGE T. WHITE.

Witnesses:
GEORGE W. SHEPPARD,
HELEN FLANNIGAN.